US012537401B2

(12) United States Patent
Del Greco

(10) Patent No.: US 12,537,401 B2
(45) Date of Patent: Jan. 27, 2026

(54) ELECTRIC MACHINE ROTOR AND RELATED ELECTRIC MACHINE

(71) Applicant: MARELLI EUROPE S.P.A., Corbetta (IT)

(72) Inventor: Stefano Del Greco, Corbetta (IT)

(73) Assignee: MARELLI EUROPE S.P.A., Corbetta (IT)

( * ) Notice: Subject to any disclaimer, the term of this patent is extended or adjusted under 35 U.S.C. 154(b) by 322 days.

(21) Appl. No.: 18/181,075

(22) Filed: Mar. 9, 2023

(65) Prior Publication Data

US 2023/0291251 A1 Sep. 14, 2023

(30) Foreign Application Priority Data

Mar. 10, 2022 (IT) .................. 102022000004607

(51) Int. Cl.
 H02K 1/24 (2006.01)
 H02K 7/00 (2006.01)

(52) U.S. Cl.
 CPC ............. *H02K 1/24* (2013.01); *H02K 7/003* (2013.01)

(58) Field of Classification Search
 CPC ........... H02K 7/003; H02K 1/24; H02K 1/32; H02K 221/03
 USPC ...................................................... 310/40 R
 See application file for complete search history.

(56) References Cited

U.S. PATENT DOCUMENTS

| 2010/0026128 | A1* | 2/2010 | Ionel | H02K 1/276 |
| | | | | 310/156.53 |
| 2012/0256516 | A1* | 10/2012 | Matsushita | H02K 1/28 |
| | | | | 310/216.124 |
| 2020/0350793 | A1* | 11/2020 | Iga | H02K 1/278 |

FOREIGN PATENT DOCUMENTS

| DE | 102008038726 B3 | 4/2010 |
| EP | 2835888 A2 | 2/2015 |

OTHER PUBLICATIONS

Search Report for Italian Patent Application No. 202200004607 dated Oct. 24, 2022.
Communication mailed Jun. 23, 2023 transmitting the European Search Report dated Jun. 15, 2023 for European Patent Application No. 23160043.8.

* cited by examiner

*Primary Examiner* — Terrance L Kenerly
*Assistant Examiner* — Theodore L Perkins
(74) *Attorney, Agent, or Firm* — Howard & Howard Attorneys PLLC

(57) ABSTRACT

A rotor of an electric machine comprising a drive shaft, a plurality of foils provided with an insertion seat at which they are coaxially keyed to the drive shaft at a keying portion. The foils have the shape of a circular sector extending from an outer edge, corresponding to an outer diameter of the rotor, and an inner edge, corresponding to a minimum or inner diameter delimiting the insertion seat which interfaces with the keying portion of the drive shaft. The keying portion includes a lateral surface which interfaces with the insertion seat of the foils. The foils include cavities passing through an axial thickness of the foil, which impart elasticity in a radial direction, perpendicular to the rotation axis, to blocking portions of the foils. The blocking portions include a central block, having a central radial thickness, and two (Continued)

lateral blocks, having an intermediate radial thickness and an end radial thickness which are lower than the central radial thickness of the central block.

14 Claims, 9 Drawing Sheets

ELECTRIC MACHINE ROTOR AND RELATED ELECTRIC MACHINE

CROSS-REFERENCE TO RELATED APPLICATIONS

The present application claims priority to and all the benefits of Italian Patent Application No. 102022000004607, filed on Mar. 10, 2022, which is hereby expressly incorporated herein by reference.

BACKGROUND OF THE INVENTION

1. Field of the Invention

The present invention relates to a rotor of an electric machine and the related electric machine comprising the rotor.

2. Description of the Related Art

In the field of rotors of electric machines, e.g., of electric motors, a strong connection is required between the rotor shaft and the corresponding magnetic foils, which are, in turn, stacked axially along the rotation axis of the rotor. Indeed, such a connection must ensure the torque transmission between the components in all the speed and torque ranges in which the electric motor operates.

This connection can be achieved by mechanical interference coupling of the aforesaid parts.

The centrifugal forces due to the high rotation speed (which can reach up to about 30,000 rpm) cause radial deformations on the coupling diameter of the foils with the rotor, different between the shaft and the foils. Therefore, high interference between the parts is required under static conditions, i.e., when they are keyed onto the shaft, in order to ensure a strong and secure mechanical connection.

The assembly between parts can be achieved by press-fitting, i.e., by cold (ambient temperature) driving the foils onto the shaft, or by shrink-fitting, i.e., after heating the foil and keying it onto the shaft, or after cooling the shaft and keying the foil pack.

Press-fitting is always preferred, but it is not applicable when the required interferences are high, because they would create problems due to the plasticity of the materials resulting in burr formation.

Hot keying can really ensure high interferences during assembly, but it has higher processing costs and lower quality results because it can result in discoloration and mechanical instability deformation of the parts, as well as the occurrence of approximate positioning tolerances.

The press-fitting operation, associated with high interference values between the parts, leads to high pressing forces and generation of chips and burrs between the shaft and the foils.

During the shaft driving process, the chips, which gradually increase as the shaft is pressed through the foils, can cause cold welding between the shaft and the foils themselves. Thus, while this increases the driving force, and thus the ability to transmit torque even at high rotation speed, it also damages the rotor foils and/or the lateral wall of the shaft.

Solutions involving positive coupling, typically of the male-female type (e.g., recess-tooth) are also known to ensure torque transmission even at high rotation speeds. However, such solutions have the disadvantage that they require extremely expensive precision machining and associated foil assembly automation. Furthermore, the presence of asymmetries due to the voids and solids of the coupling elements can imply dynamic shaft imbalances, especially at high rotation speeds.

Therefore, the known solutions fail to provide a safe, firm, and precise coupling, which can allow the transmission of high torques and/or power without damaging the foils and/or the shaft at the same time.

SUMMARY OF THE INVENTION

Therefore, the need is felt to solve the drawbacks and limitations mentioned above with reference to the prior art.

Such a need is met by a rotor of an electric machine of the present invention comprising a drive shaft extending along a rotation axis, a plurality of foils provided with an insertion seat at which they are coaxially keyed to the drive shaft at a keying portion of the drive shaft. The foils have the shape of a circular sector extending from an outer edge, corresponding to an outer diameter of the rotor, and an inner edge, corresponding to a minimum or inner diameter delimiting the insertion seat which interfaces with the keying portion of the drive shaft. The keying portion includes a lateral surface which interfaces with the insertion seat of the foils. The foils, on the side of the inner edge, comprise cavities passing through an axial thickness of the foil, parallel to the rotation axis, which impart elasticity in a radial direction, perpendicular to the rotation axis, to blocking portions of the foils, radially enclosed between the inner edge and lateral ends of the cavities. The blocking portions comprise a central block, having a central radial thickness, and two lateral blocks, having an intermediate radial thickness and an end radial thickness which are lower than the central radial thickness of the central block. The present invention is also directed toward an electric machine that includes the rotor described above.

BRIEF DESCRIPTION OF THE DRAWINGS

Further features and advantages of the present invention will be more comprehensible from the following description of preferred embodiments thereof, given by way of non-limiting examples, in which.

DETAILED DESCRIPTION OF THE INVENTION

Figure 1:
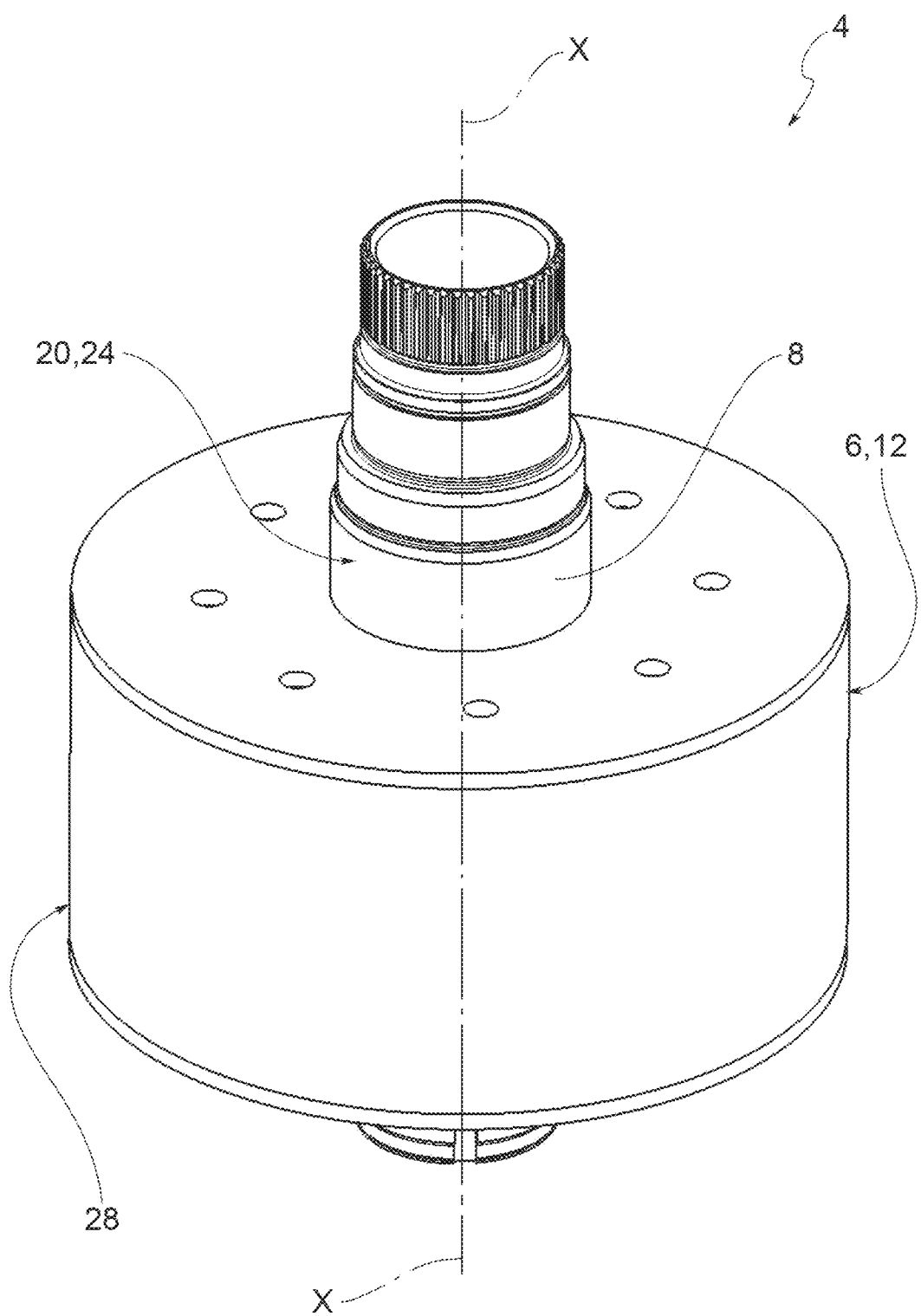
FIG. 1 is a perspective view, in an assembled configuration, of an electric machine according to an embodiment of the present invention.
Figure 2:
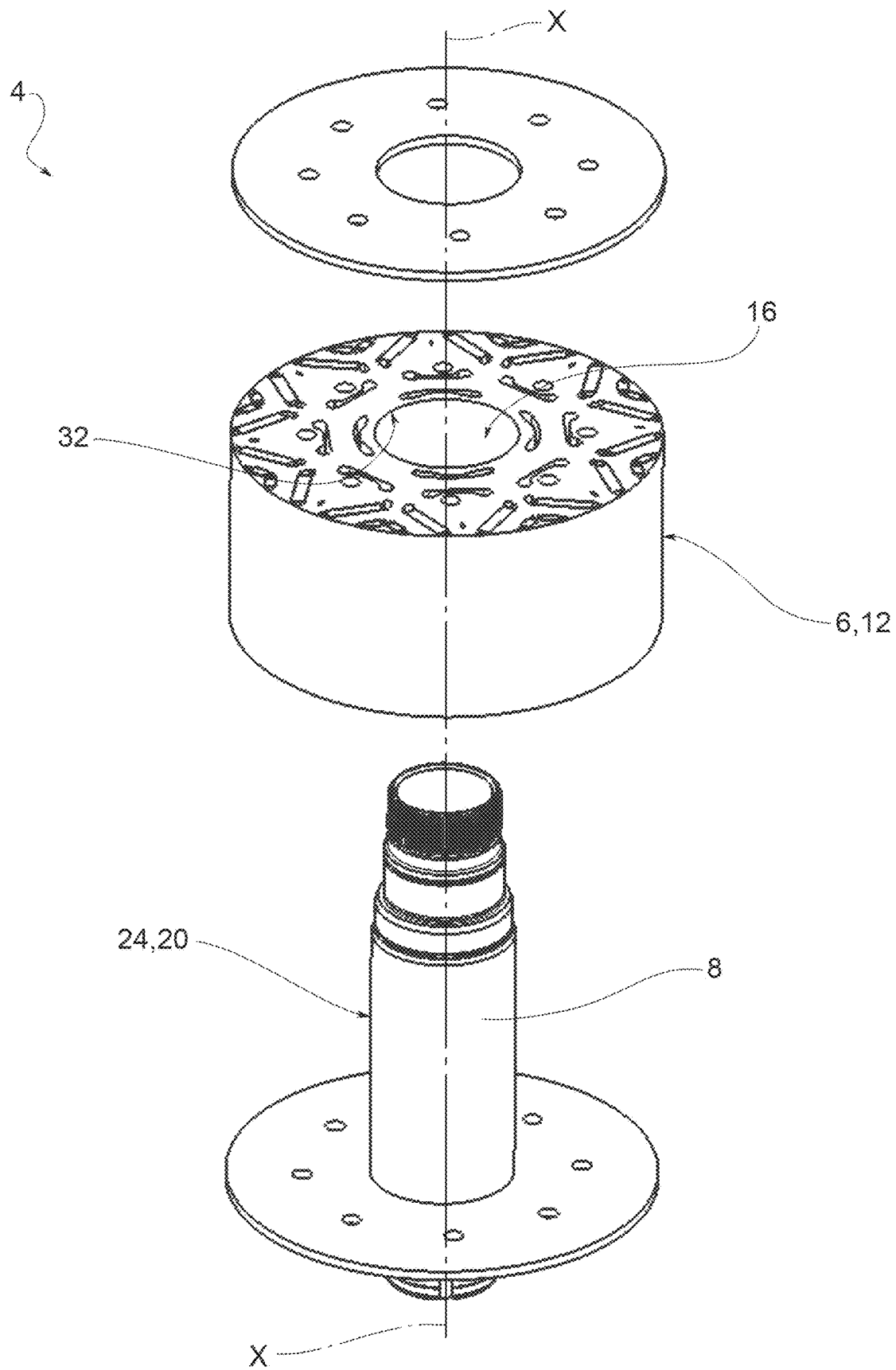
FIG. 2 is a perspective view, with parts separated, of the electrical machine in FIG. 1.

With reference to the aforesaid figures, reference numeral 4 indicates as a whole an overall diagrammatic view of an electric machine comprising a rotor 6 having a drive shaft 8 on which a plurality of foils 12 are keyed, according to the present invention.

It is worth noting that the term electric machine as used herein refers to both an electric motor and an electric generator.

The drive shaft 8 extends along a rotation axis X-X and supports, integrally to its own rotation, a plurality of foils 12, made of ferromagnetic material, in a known manner.

The foils 12 are each provided with an insertion seat 16 at which they are keyed coaxially to the drive shaft 8 at a keying portion 20 of the drive shaft 8 which comprises a lateral surface 24 which interfaces with the insertion seat 16 of the foils 12.

The foils 12 overall have the shape of a circular sector extending from an outer edge 28, corresponding to an outer diameter of the rotor 6, and an inner edge 32, corresponding to a minimum or inner diameter which delimits the insertion seat 16 which interfaces with the keying portion 20 of the drive shaft 8.

According to a possible embodiment, the lateral surface 24 of the keying portion 20 may include a plurality of ridges and throats.

According to a possible variant, the keying portion 20 can also comprise a knurling or a grooved profile having a plurality of grooves parallel to the rotation axis X-X.

According to a possible embodiment, the keying portion 20 may include a grooved profile having a plurality of grooves, e.g., parallel to the rotation axis X-X.

Figure 9:
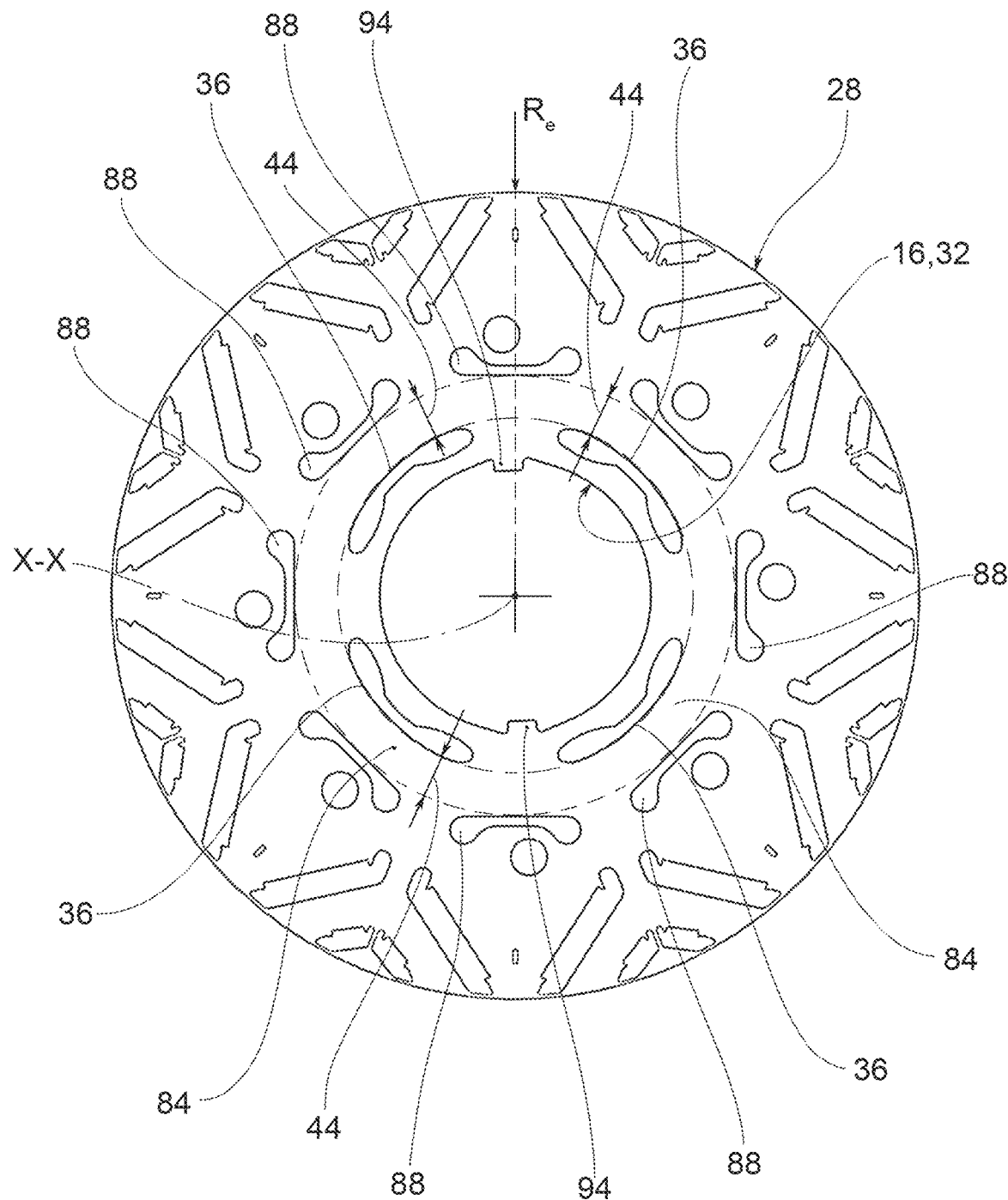
FIG. 9 is a plan perspective view of a foil of an electrical machine according to a further embodiment of the present invention.

According to a possible embodiment (FIG. 9), the coupling between the keying portion 20 of the drive shaft 8 and the insertion seat 16 of the foil 12 involves using at least one tooth 94, preferably engaged on a corresponding throat or groove (not depicted). Preferably, the tooth 94 is associated with the foil while the throat or groove is associated with the drive shaft 8. Preferably, two teeth 94, with corresponding grooves, arranged in diametrically opposite positions with respect to the rotation axis X-X, are used.

The foils 12, on the side of the inner edge 32, include cavities 36 passing through an axial thickness of foil 12, parallel to the rotation axis X-X.

The cavities 36 impart elasticity in a radial direction R-R, perpendicular to the rotation axis X-X, to blocking portions 40 of the foils 12, radially enclosed between the inner edge 32 and lateral ends 44 of the cavities 12.

The blocking portions 40 include a central block 48 having a central radial thickness h2, and two lateral blocks 52. The lateral blocks 52 can have an intermediate radial thickness h1 and an end radial thickness h0, both of which are lower than the central radial thickness h2 of the central block 48.

In one embodiment, having defined d the diameter of the insertion seat 16, the ratio h0/d, between the radial end thickness h0 and the diameter d of the insertion seat, is between 0.05 and 0.2. In one embodiment, the ratio h1/h0, between the intermediate radial thickness h1 and the end radial thickness h0, is between 0.5 and 0.9. In one embodiment, the ratio h2/h1, between the central radial thickness h2 and the intermediate radial thickness h1 is between 1.25 and 1.7.

This sizing contributes to obtaining the technical effect of increasing the radial force exchanged between the inner edge 32 of the foil 12 and the keying portion 20 of the shaft 8 as the rotation speed of the latter increases.

The cavities 36 are defined by closed polylines, with respect to a section plane perpendicular to the rotation axis X-X.

In one embodiment, the cavities 36 are mutually equal and arranged at the same radial distance from the rotation axis X-X.

The foils 12 comprise 'n' cavities 36 angularly equally spaced apart from one other with respect to the rotation axis X-X.

According to a possible embodiment, having defined a2 the angular width of the central block 48 with respect to the rotation axis X-X, and having defined a1 the angular width of the lateral blocks 52 with respect to the rotation axis X-X, the ratio a2/a1 is between 0.5 and 1.5. This sizing contributes to obtaining the technical effect of increasing the radial force exchanged between the inner edge 32 of the foil 12 and the keying portion 20 of the shaft 8 as the rotation speed of the latter increases.

According to a possible embodiment, the ratio between an overall angular width 60, with respect to the rotation axis X-X, of a first cavity 36' and an angular pitch 64, with respect to the rotation axis X-X, between the first cavity 36' and a second cavity 36" adjacent to the first cavity 36', is between 1.3 and 2.1, preferably equal to 1.6. This sizing contributes to obtaining the technical effect of increasing the radial force exchanged between the inner edge 32 of the foil 12 and the keying portion 20 of the shaft 8 as the rotation speed of the latter increases.

In one embodiment, each cavity 36 has an overall angular width 60, with respect to the rotation axis X-X, between 45 and 75 degrees. This sizing contributes to obtaining the technical effect of increasing the radial force exchanged between the inner edge 32 of the foil 12 and the keying portion 20 of the shaft 8 as the rotation speed of the latter increases.

The foil 12 further include an outer circular crown 76 having seats 80 for housing magnets. Each 12 foil includes 'm' poles, having an angular width γ equal to 360/m. In one embodiment, the ratio between the number of 'm' poles and the number of cavities 36 is between 1.15 and 4. This sizing contributes to obtaining the technical effect of increasing the radial force exchanged between the inner edge 32 of the foil 12 and the keying portion 20 of the shaft 8 as the rotation speed of the latter increases.

In one embodiment, between the outer circular crown 76 and the cavities 36 there is an inner circular crown 84 externally delimited, towards the outer edge 28, by a plurality of recesses or lightenings 88.

According to a possible embodiment, the ratio between a radial thickness h4 of the inner circular crown 84 and the outer radius Re of the foil 12 at the outer edge 28 is between 0.05 and 0.25. The outer radius Re is half the outer diameter of the rotor 6.

The recesses or lightenings 88 are adapted to generate an almost circular geometry; this inner circular crown 84 on speed expands as also biased by the outer circular crown 76 and, by stretching the blocking portion 40, causes it to be pressed against the drive shaft 8. Furthermore, the position and number of poles are thus also relieved from the number of cavities 36.

The foil 12 can include salient poles, at least partially angularly aligned with the blocking portions 40, with respect to the rotation axis X-X.

The assembly and operation of a rotor 6 according to the present invention will now be described.

In particular, the foils 12 can be cold-keyed, i.e., at ambient temperature and in any case without any heat pre-treatment, onto the motor shaft 8.

During the keying, the expected interference between the insertion seat 16 and the keying portion 20 is limited. Moreover, the cavities 36 impart some radial elasticity to the inner edge 32, which thus offers little resistance during keying.

Figure 3:
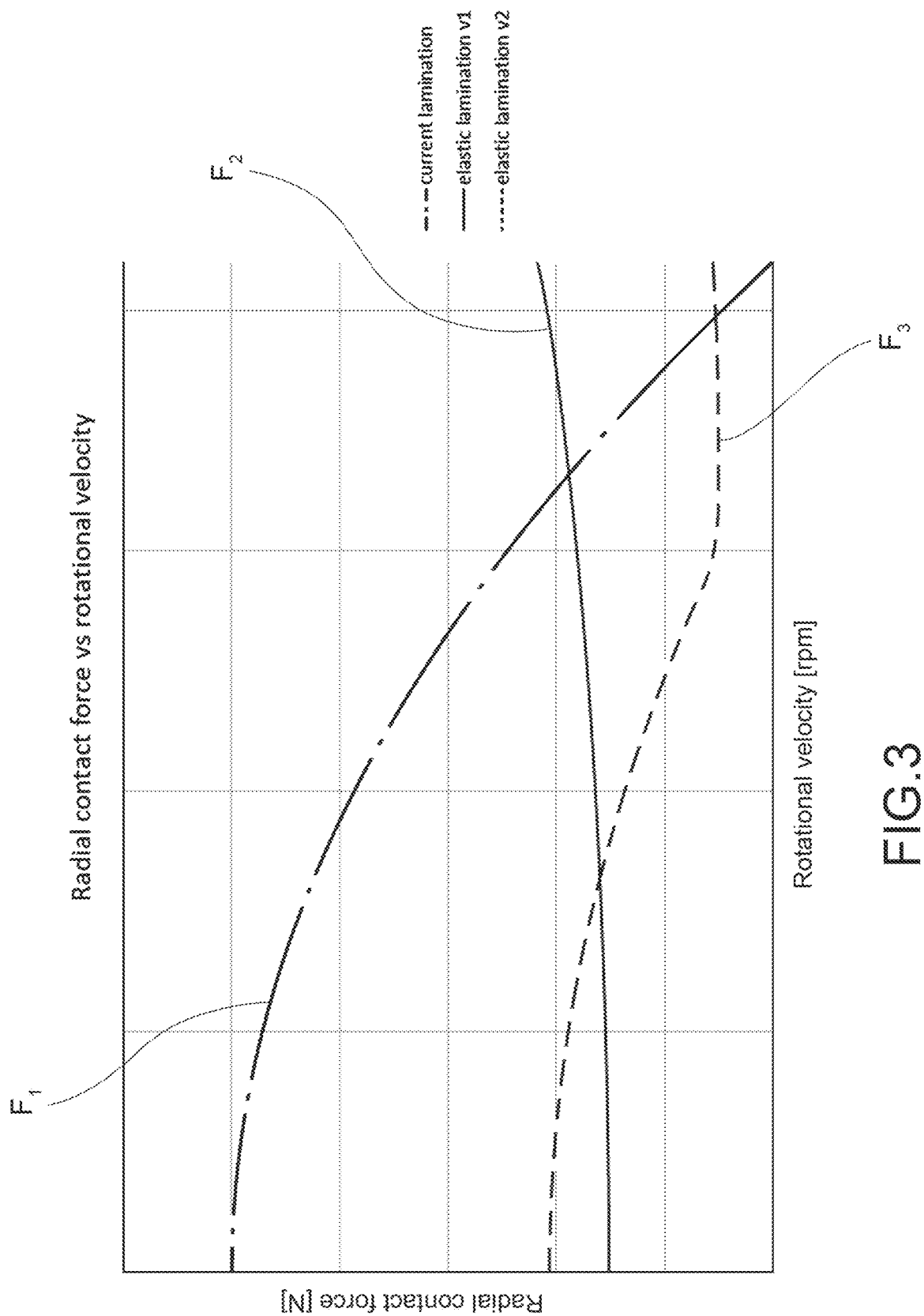
FIG. 3 shows a comparative graph of the radial contact force between the foils and the drive shaft between solutions of the prior art and solutions according to the present invention.
Figure 4:
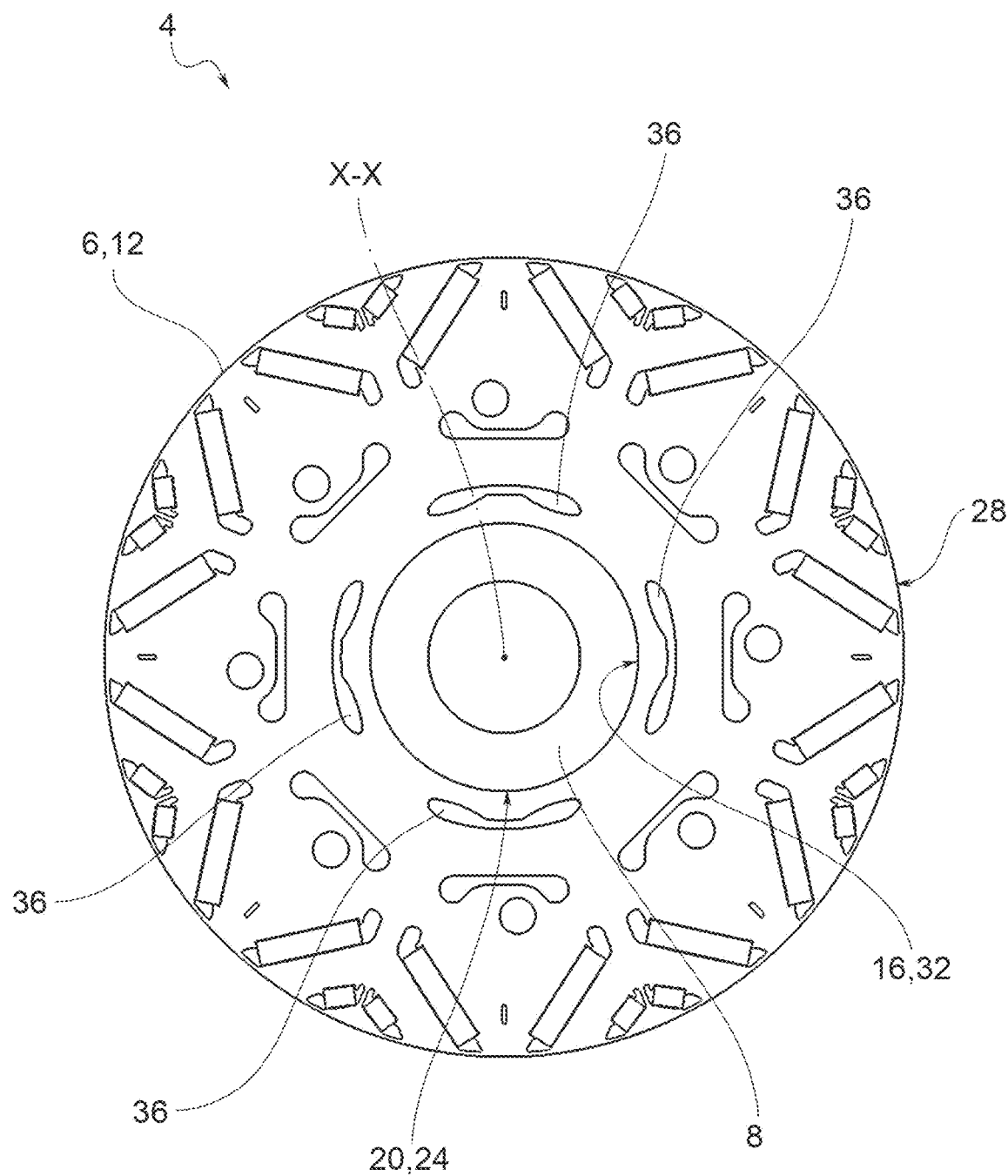
FIG. 4 shows a front view of a foil mounted on a drive shaft according to the present invention.

After keying, the initial interference, under static conditions, between the drive shaft 8 and the foils 12 is lower than in the known solutions. As best shown in FIG. 3, graph F1 shows the trend of the radial force between the drive shaft 8 and the inner edge 32 as the rotation speed of the shaft changes. Graphs F2 and F3 show the same curves with solutions according to the present invention. Although the force under static conditions is lower, the solutions according to the invention are perfectly capable of transmitting adequate burst torques.

Figure 5:
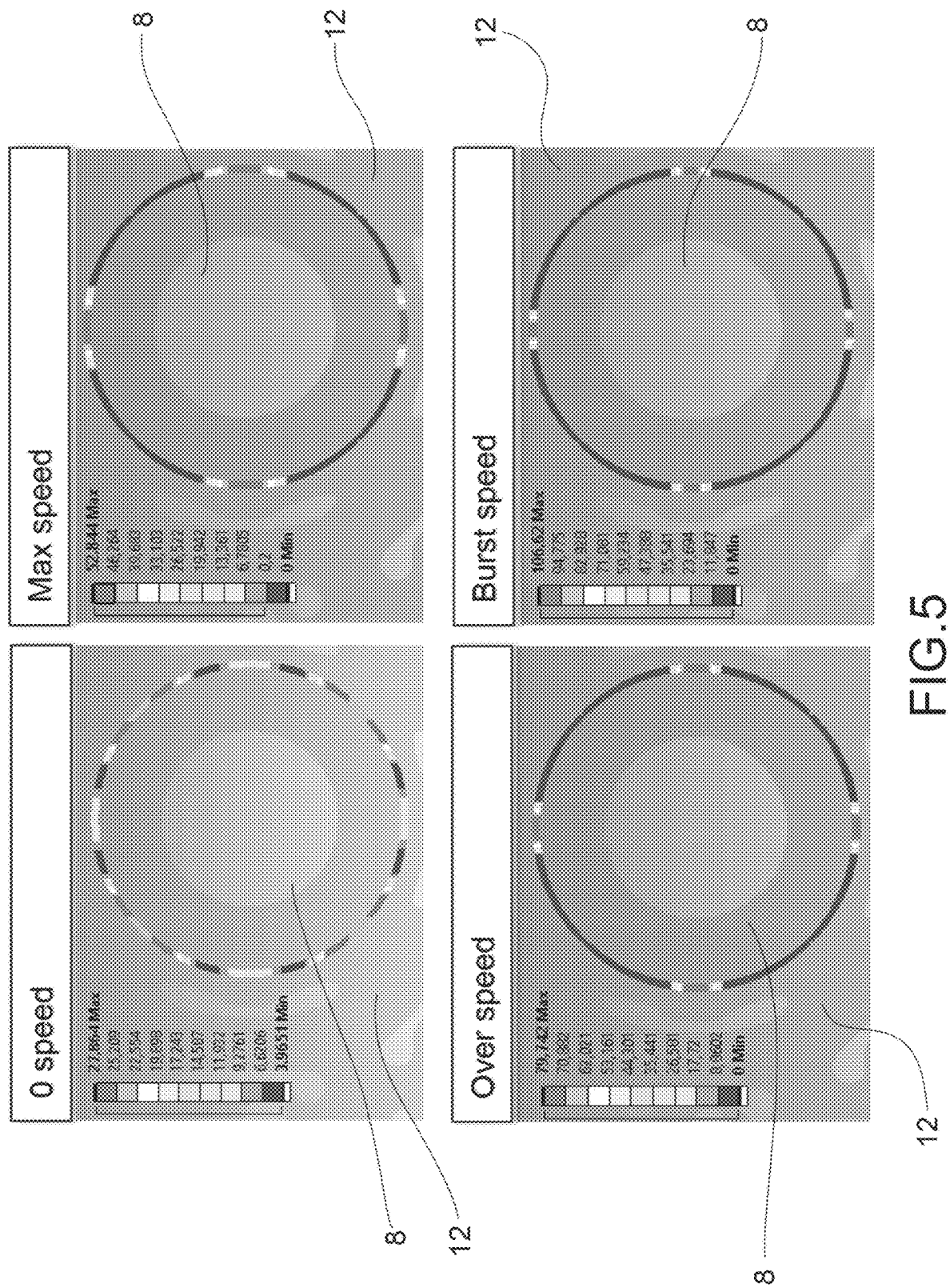
FIG. 5 shows diagrammatic views of the mechanical behavior of a foil keyed onto a drive shaft according to the present invention, taken to different rotation speeds.
Figure 6:
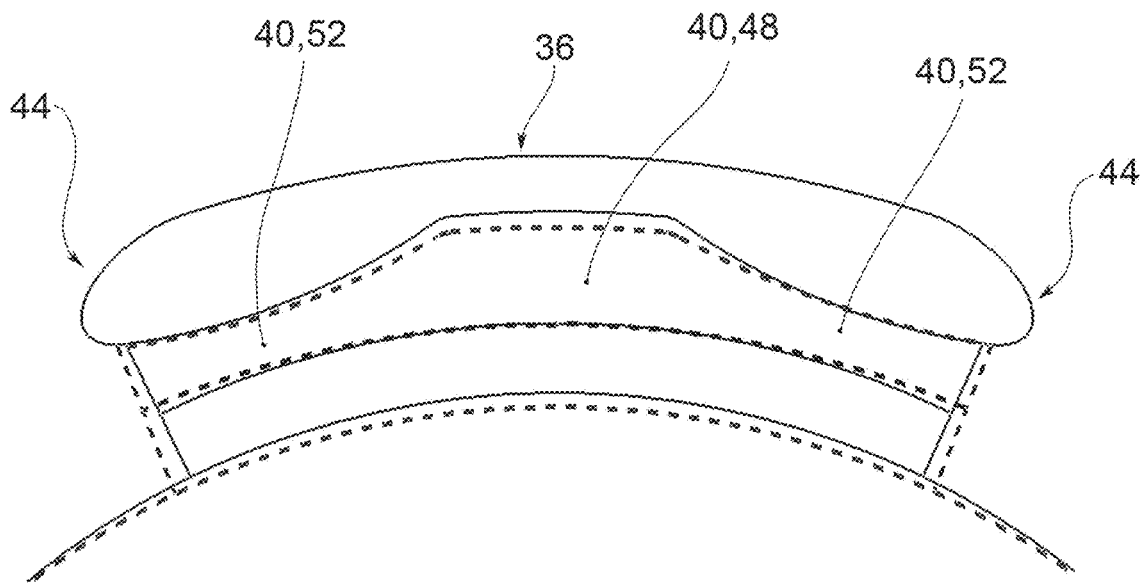
FIG. 6 shows a view diagrammatically illustrating the elastic deformation of a foil according to the present invention as the rotation speed increases.
Figure 7A:
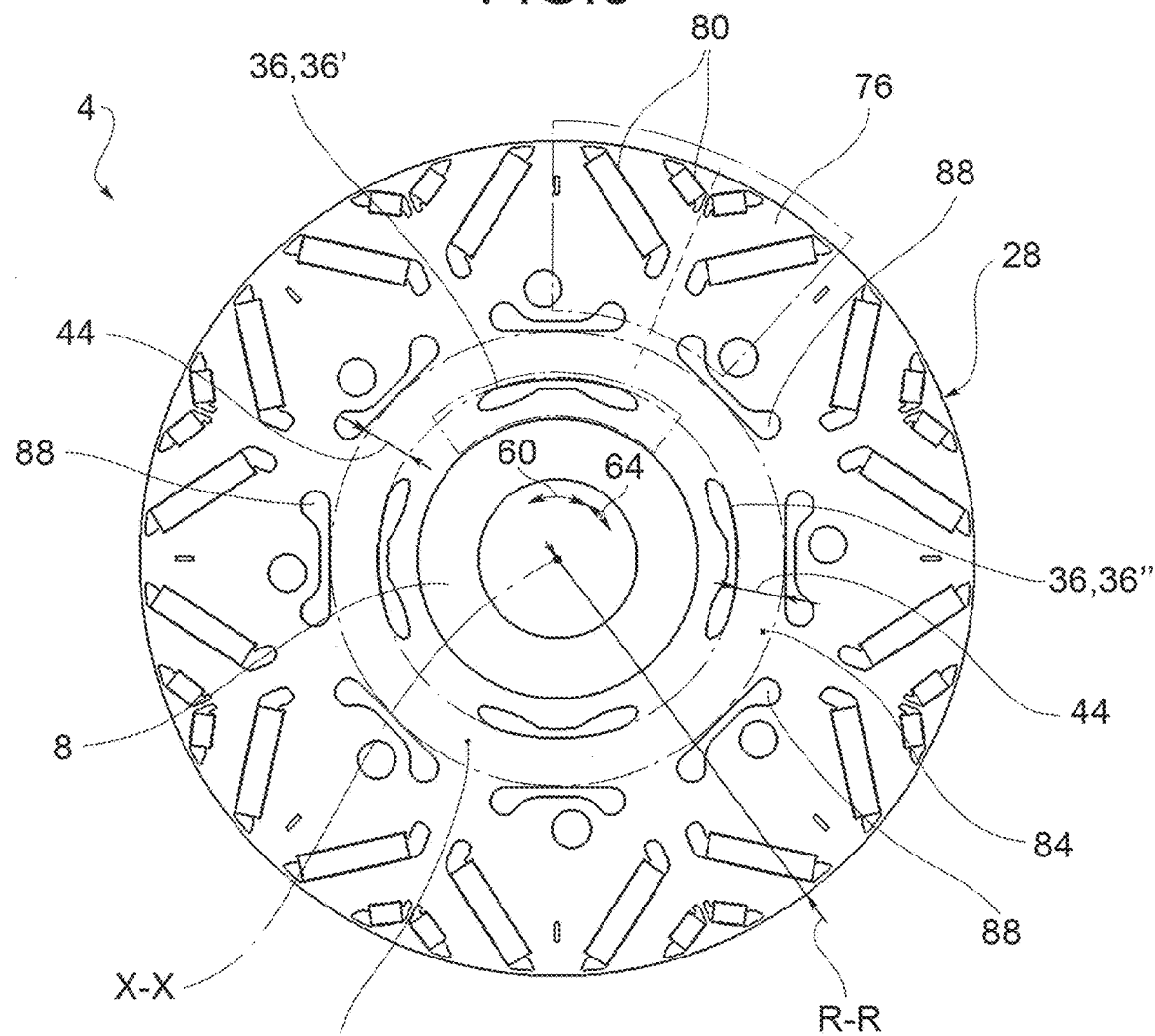
FIG. 7A-7B show front views of a foil mounted on a drive shaft according to the present invention.
Figure 7B:
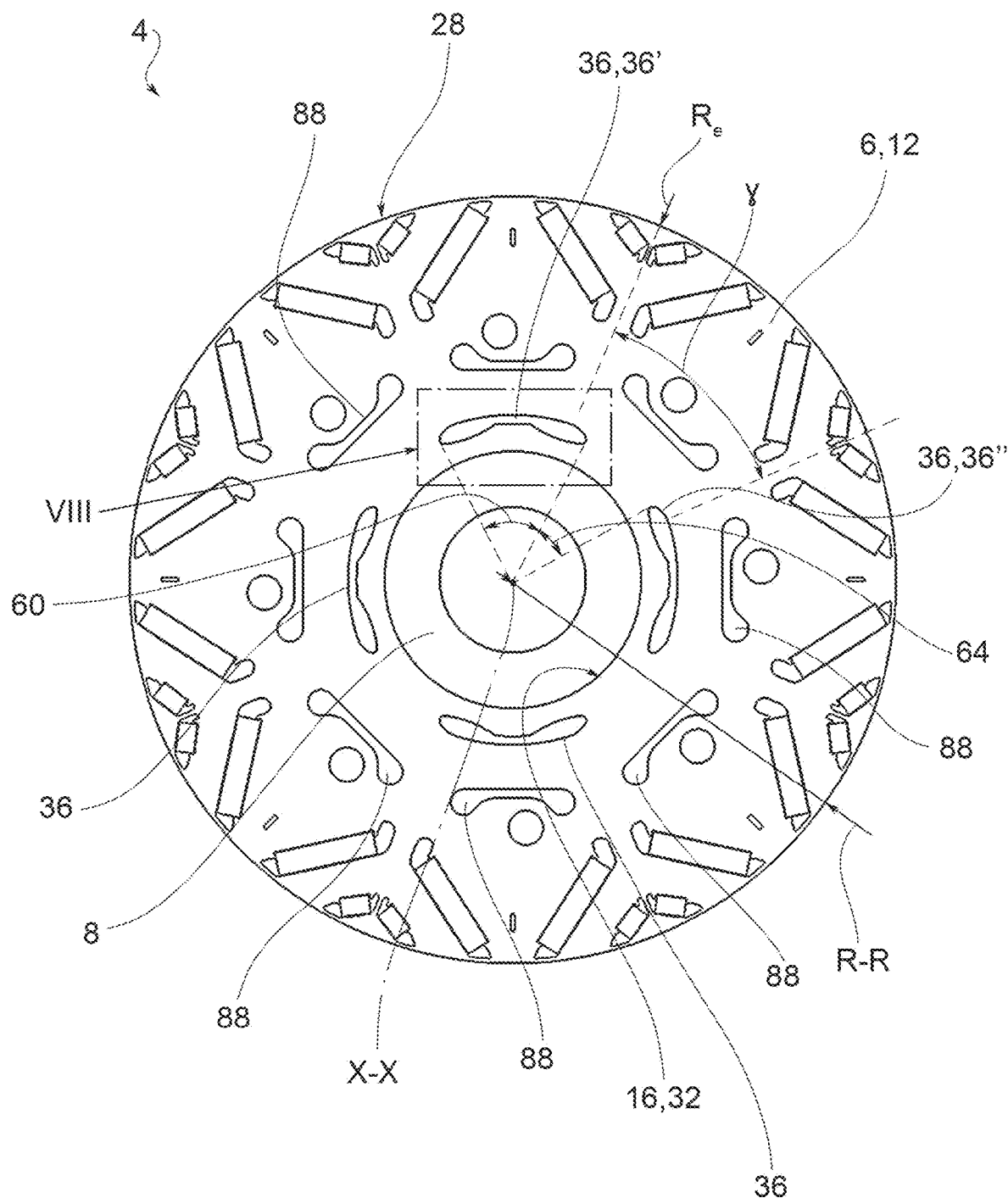
Figure 8:
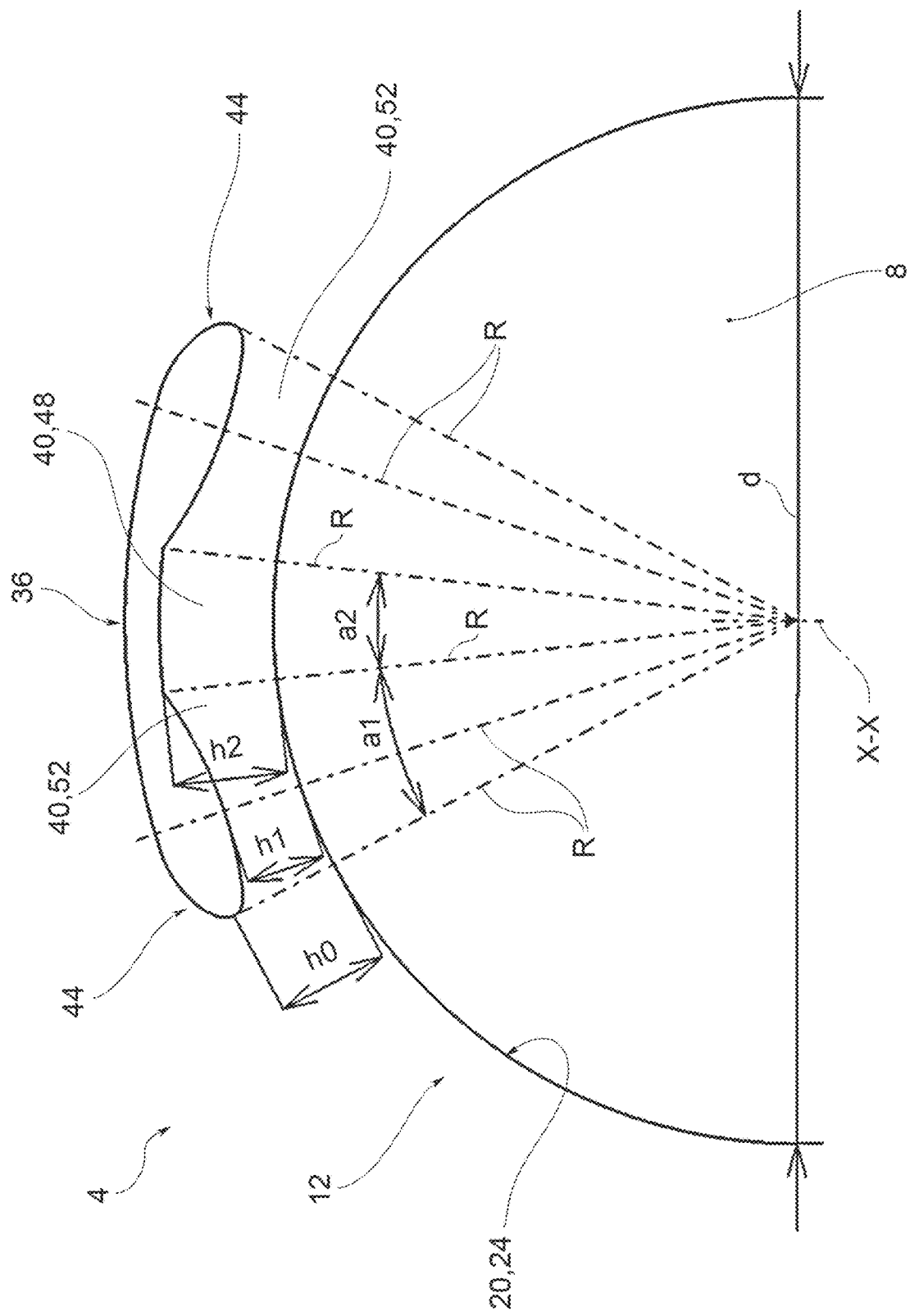
FIG. 8 shows an enlarged detail VIII indicated in FIGS. 7A-7B.

As the rotation speed increases, the trends of the radial force tend to reverse. Indeed, in graph F1 the force decreases, while in graphs F2 and F3, above a given value, the radial force increases. This increase is because the centrifugal force acting on the inner circular crown 84 tends to "straighten" the curvature of the cavities 36, as shown in FIG. 6. The cavity 36 has a varying stiffness so that the central block 48 is stiffer than the lateral blocks 52. This implies that the central block 48 deforms less than the lateral blocks, which by stretching tangentially tend to push the central block radially towards the drive shaft 8. Thus, the inner edge 32, at the central blocks 48, presses more and more against the keying portion 20. This technical effect is clearly shown in FIG. 5 in which as the rotation speed increases, one can see just how the blocking portions 40 align more and more with the central blocks 48 until they substantially coincide therewith. Advantageously, the transmitted torque thus increases as the rotation speed increases, instead of decreasing as is the case in the prior-art solutions.

As can be appreciated from the description above, the present invention allows overcoming the drawbacks presented in the prior art.

Advantageously, the described solution allows limiting the contact/friction forces during the step of cold-driving the foils onto the drive shaft by virtue of the provision of not particularly tight coupling tolerances, even without the need to create specific shape couplings between teeth and corresponding recesses, which would significantly increase costs and require high manufacturing and assembly precision.

The contact surface between the rotor foils and the motor shaft can thus be extended to 360° without creating the burr and high interference problems of the prior-art solutions.

Indeed, for this purpose, a special geometry of the inner recesses in the foils was introduced, which allows increasing the tightening torque between the foil and the shaft as the rotation speed of the shaft, and thus of the foil, increases.

Thus, a relatively low cold-driving force of the foil on the shaft is obtained because it is obtained with not particularly tight coupling tolerances, and as the rotation speed increases, the tightening torque between the foil and the shaft can be automatically increased by virtue of the specific deformation of the foil obtained at the recesses. This dynamic behavior is opposed to the solutions known in the art in which, as the rotation speed of the shaft increases, the driving force of the foils on the shaft (and thus the torque transmission capacity) tends to decrease. It is thus possible to perform the cold keying of foils, i.e., at ambient temperature, without requiring any specific heat treatment of the foil and/or shaft.

Furthermore, the use of adhesives is not needed to increase the torque transmission between the foils and the shaft.

Moreover, in order to further facilitate the cold keying of the foils onto the shaft, the recesses or lightenings increase the radial elasticity of the corresponding portions of the foils in contact with the lateral wall of the shaft. In other words, by virtue of the recesses or lightenings, when keying the foils on the drive shaft, the corresponding blocking portions of the foil on the shaft can retract radially, away from the keying portion of the drive shaft, and thus the force required for the keying itself is reduced.

By virtue of the reduced keying force thus obtained, there is a substantial absence of chip/scrap buildup, which not only allows reducing the frictional force but also avoiding misalignment and/or imbalance between the foils themselves and the drive shaft.

Furthermore, the solution according to the present invention allows avoiding expensive precision machining operations for manufacturing teeth/recesses, as is the case in some solutions known in the art.

Finally, the solution according to the present invention allows transmitting high burst torques without employing adhesives between the foils and the shaft.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A rotor of an electric machine comprising:
    a drive shaft extending along a rotation axis,
    a plurality of foils provided with an insertion seat at which they are coaxially keyed to the drive shaft at a keying portion of the drive shaft,
    the foils overall having the shape of a circular sector extending from an outer edge, corresponding to an outer diameter of the rotor, and an inner edge, corresponding to a minimum or inner diameter delimiting said insertion seat which interfaces with the keying portion of the drive shaft,
    wherein said keying portion comprises a lateral surface which interfaces with the insertion seat of the foils,
    wherein the foils, on the side of the inner edge, comprise cavities passing through an axial thickness of the foil, parallel to the rotation axis, which impart elasticity in a radial direction, perpendicular to the rotation axis, to blocking portions of the foils, radially enclosed between said inner edge and lateral ends of the cavities,
    wherein the blocking portions comprise a central block, having a central radial thickness, and two lateral blocks, having an intermediate radial thickness and an end radial thickness which are lower than said central radial thickness of the central block; and
    wherein the ratio between an overall angular extension, with respect to the rotation axis, of a first cavity and an angular pitch, with respect to the rotation axis, between said first cavity and a second cavity adjacent to the first cavity, is between 1.3 and 2.1.

2. The rotor of an electric machine as set forth in claim 1, wherein the ratio between the intermediate radial thickness and the end radial thickness, is between 0.5 and 0.9.

3. The rotor of an electric machine as set forth in claim 1, wherein the ratio between the central radial thickness and the intermediate radial thickness, is between 1.25 and 1.7.

4. The rotor of an electric machine as set forth in claim 1, wherein said cavities are defined by closed polylines, with respect to a section plane perpendicular to said rotation axis.

5. The rotor of an electric machine as set forth in claim 1, wherein said cavities are mutually equal and arranged at the same radial distance with respect to the rotation axis.

6. The rotor of an electric machine as set forth in claim 1, wherein the foils comprise 'n' cavities angularly equally spaced apart from one another with respect to said rotation axis.

7. The rotor of an electric machine as set forth in claim 1, wherein each cavity has an overall angular width, with respect to said rotation axis, between 45 and 75 degrees.

8. The rotor of an electric machine as set forth in claim 7, wherein each foil comprises 'm' poles, having an angular width y equal to 360/m, wherein the ratio between said number of 'm' poles and the number of cavities is between 1.15 and 4.

9. The rotor of an electric machine as set forth in claim 1, wherein said foil comprises an outer circular crown having seats for housing poles.

10. The rotor of an electric machine as set forth in claim 9, wherein between the outer circular crown and the cavities there is an inner circular crown externally delimited, towards the outer edge, by a plurality of recesses.

11. The rotor of an electric machine as set forth in claim 10, wherein the ratio between a radial thickness of said inner circular crown and an outer radius of the rotor, at the outer edge, is between 0.05 and 0.25.

12. An electric machine comprising the rotor as set forth in claim 1.

13. A rotor of an electric machine comprising:
a drive shaft extending along a rotation axis,
a plurality of foils provided with an insertion seat at which they are coaxially keyed to the drive shaft at a keying portion of the drive shaft,
the foils overall having the shape of a circular sector extending from an outer edge, corresponding to an outer diameter of the rotor, and an inner edge, corresponding to a minimum or inner diameter delimiting said insertion seat which interfaces with the keying portion of the drive shaft,
wherein said keying portion comprises a lateral surface which interfaces with the insertion seat of the foils,
wherein the foils, on the side of the inner edge, comprise cavities passing through an axial thickness of the foil, parallel to the rotation axis, which impart elasticity in a radial direction, perpendicular to the rotation axis, to blocking portions of the foils, radially enclosed between said inner edge and lateral ends of the cavities,
wherein the blocking portions comprise a central block, having a central radial thickness, and two lateral blocks, having an intermediate radial thickness and an end radial thickness which are lower than said central radial thickness of the central block; and
wherein the insertion seat has a defined diameter and the ratio between the radial end thickness of the two lateral blocks and the diameter of the insertion seat is between 0.05 and 0.2.

14. A rotor of an electric machine comprising:
a drive shaft extending along a rotation axis,
a plurality of foils provided with an insertion seat at which they are coaxially keyed to the drive shaft at a keying portion of the drive shaft,
the foils overall having the shape of a circular sector extending from an outer edge, corresponding to an outer diameter of the rotor, and an inner edge, corresponding to a minimum or inner diameter delimiting said insertion seat which interfaces with the keying portion of the drive shaft,
wherein said keying portion comprises a lateral surface which interfaces with the insertion seat of the foils,
wherein the foils, on the side of the inner edge, comprise cavities passing through an axial thickness of the foil, parallel to the rotation axis, which impart elasticity in a radial direction, perpendicular to the rotation axis, to blocking portions of the foils, radially enclosed between said inner edge and lateral ends of the cavities,
wherein the blocking portions comprise a central block, having a central radial thickness, and two lateral blocks, having an intermediate radial thickness and an end radial thickness which are lower than said central radial thickness of the central block; and
wherein the central block has an angular width (a2) with respect to the rotation axis and the lateral blocks have an angular width (a1) with respect to the rotation axis and the ratio (a2/a1) is between 0.5 and 1.5.

* * * * *